United States Patent
Boucher (12)

(10) Patent No.: US 6,325,187 B1
(45) Date of Patent: Dec. 4, 2001

(54) DIRT WIPER SYSTEM FOR SUSPENSION DAMPER

(75) Inventor: David J. Boucher, Newport, MI (US)

(73) Assignee: Tenneco Automotive Inc., Lake Forest, IL (US)

(*) Notice: Subject to any disclaimer, the term of this patent is extended or adjusted under 35 U.S.C. 154(b) by 0 days.

(21) Appl. No.: 09/310,318

(22) Filed: May 12, 1999

(51) Int. Cl.$^7$ .................................. F16F 9/32; F16F 9/36
(52) U.S. Cl. ................................. 188/322.17; 92/165 R
(58) Field of Search .................. 188/322.17, 322.16, 188/315; 267/129; 92/165 R, 168; 277/565, 320, 513, 514, 574, 580, 552, 563, 550, 575, 558, 922, 924

(56) References Cited

U.S. PATENT DOCUMENTS

| | | |
|---|---|---|
| 3,621,952 * | 11/1971 | Long, Jr. et al. . |
| 3,804,217 * | 4/1974 | Keijzer et al. . |
| 4,166,523 | 9/1979 | Fujii et al. . |
| 4,290,511 | 9/1981 | De Baan et al. . |
| 4,342,448 | 8/1982 | Wallis . |
| 4,493,490 | 1/1985 | Ohma . |
| 4,653,618 | 3/1987 | Churchill et al. . |
| 4,880,087 | 11/1989 | Janes . |
| 4,989,701 | 2/1991 | Yamaoka et al. . |
| 4,995,623 | 2/1991 | Wada et al. . |
| 5,127,497 | 7/1992 | Struckmeyer et al. . |
| 5,176,229 | 1/1993 | Kanari et al. . |
| 5,211,268 | 5/1993 | Lizell et al. . |
| 5,224,573 * | 7/1993 | Amemiya et al. ............. 188/322.17 |
| 5,275,387 | 1/1994 | Cotter et al. . |
| 5,305,859 | 4/1994 | Davis . |
| 5,363,945 | 11/1994 | Lizell et al. . |
| 5,509,514 * | 4/1996 | Allen et al. ................... 188/322.17 |

FOREIGN PATENT DOCUMENTS

| | | |
|---|---|---|
| 2235472 | 2/1973 | (DE) . |
| 3117493 * | 11/1982 | (DE) . |
| 4302262 * | 8/1994 | (DE) . |
| 4311099 * | 10/1994 | (DE) . |
| 0 565 015 A2 | 10/1993 | (EP) . |
| 2384998 * | 10/1978 | (FR) . |
| 2526904 * | 11/1983 | (FR) ............................. 188/322.17 |
| 2607568 * | 6/1988 | (FR) . |
| 2103334 A | 2/1983 | (GB) . |
| 2108218 * | 5/1983 | (GB) ............................. 188/322.17 |
| 2349935 * | 11/2000 | (GB) . |
| 52124585 * | 10/1977 | (JP) . |
| 55103130 * | 8/1980 | (JP) ............................. 188/322.17 |
| 658358 * | 3/1994 | (JP) . |
| 11325149 * | 11/1999 | (JP) . |
| 9525913 * | 9/1995 | (WO) . |

\* cited by examiner

*Primary Examiner*—Douglas C. Butler
(74) *Attorney, Agent, or Firm*—Harness, Dickey & Pierce, PLC

(57) ABSTRACT

A shock absorber has a pressure tube, a reserve tube, a piston rod and a rod guide. The rod guide is located between the pressure tube, the reserve tube and the piston rod. A sealing system is located between the rod guide and the piston rod. The sealing system is held in place by the reserve tube. The sealing system includes a positioning ring, a damper seal and a dirt wiper. The positioning ring locates the sealing system with respect to the rod guide. The damper seal engages the positioning ring and has two sealing lips that engage the rod guide. The dirt wiper engages the damper seal and includes a lip which engages the piston rod.

17 Claims, 2 Drawing Sheets

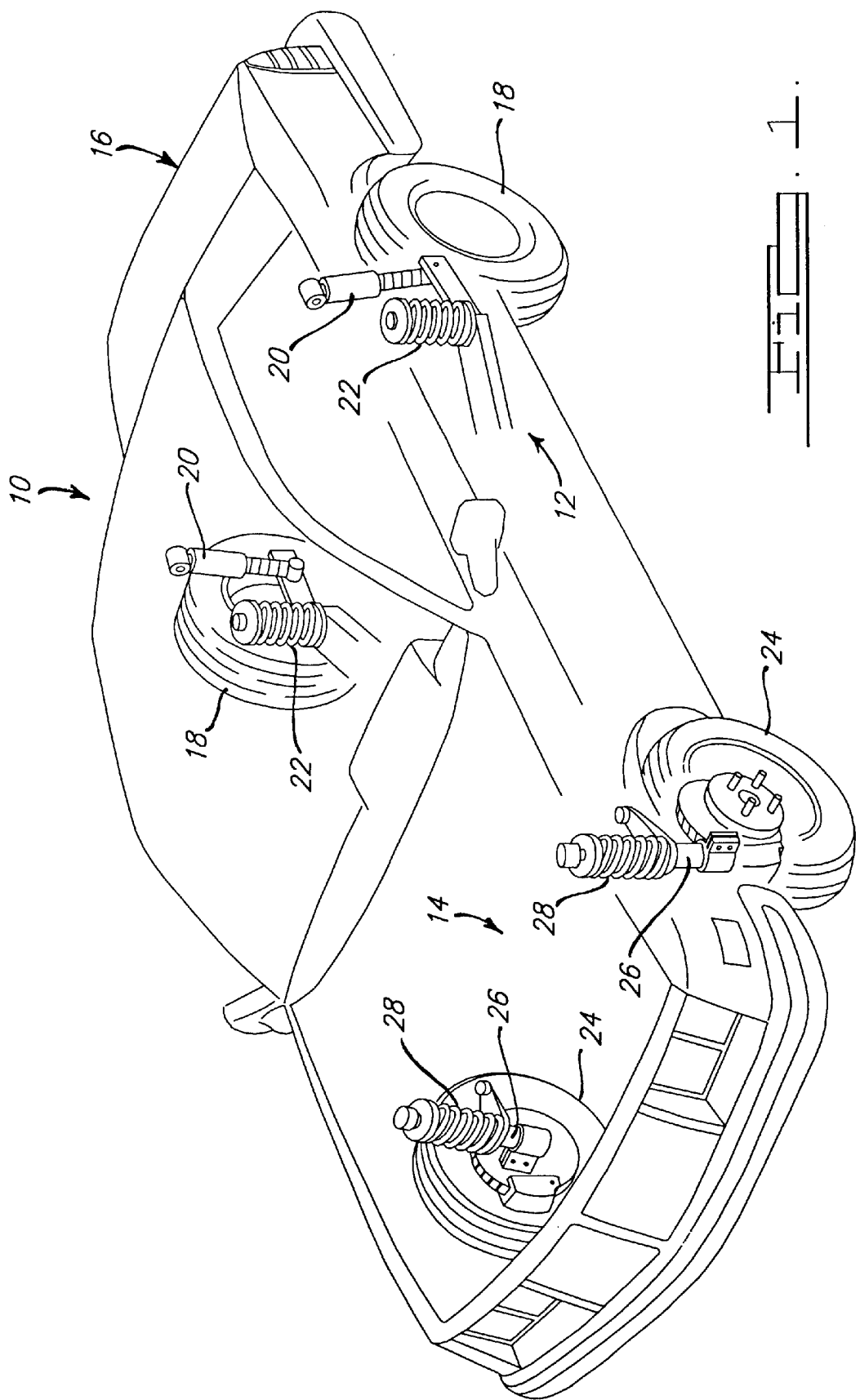

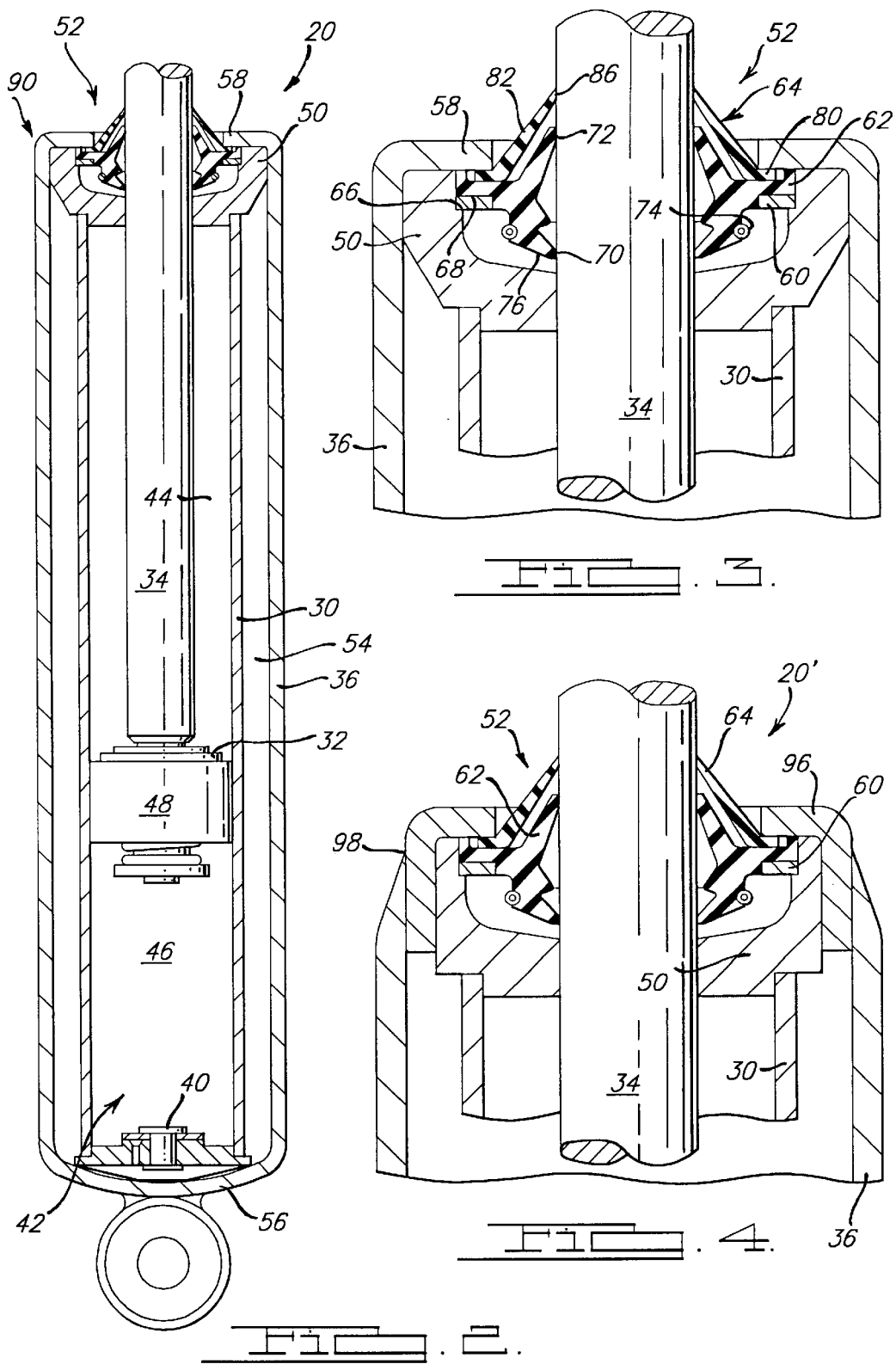

DIRT WIPER SYSTEM FOR SUSPENSION DAMPER

FIELD OF THE INVENTION

The present invention relates to shock absorbers for automotive vehicles. More particularly, the present invention relates to a unique dirt wiper system for the shock absorber.

BACKGROUND OF THE INVENTION

Shock absorbers are used in conjunction with automobile suspension systems and other vehicle suspension systems to absorb unwanted vibrations which occur during operation of the vehicle. To absorb this unwanted vibration, shock absorbers are connected between the sprung mass (the body) and the unsprung mass (the suspension system) of the vehicle. A piston is located within a pressure tube of the shock absorber and is connected to the sprung mass (or possibly the unsprung mass) of the vehicle. The pressure tube is connected to the unsprung mass (or possibly the sprung mass) of the vehicle and is normally filled with hydraulic fluid. Because the piston has the capability to limit the flow of hydraulic fluid within the pressure tube when the shock absorber is compressed or extended, the shock absorber is able to produce a damping force which counteracts the vibrations which would otherwise be transmitted from the suspension (unsprung mass) to the body (sprung mass) of the vehicle.

A conventional dual tube shock absorber comprises a pressure tube with a piston disposed therein and a reserve tube surrounding the pressure tube. A piston rod is connected to the piston and it extends through the upper end of the pressure and reserve tubes. At the lower end of the pressure tube, a base valve is located between the pressure tube and the reserve tube. The base valve controls fluid flow between the working chamber defined by the pressure tube and the reserve chamber defined by the reserve tube. The damping force is created by the restricted flow of fluid through passages in the piston and valve plates which regulate passage of fluid between opposite sides of the piston within the working chamber.

Due to the piston rod being located on only one side of the piston, a different amount of fluid is displaced on the compression stroke as opposed to the rebound stroke. The difference in the amount of fluid is termed the rod volume. The rod volume of fluid is pushed out of the pressure tube, through the base valve and into the reserve tube during a compression stroke. During a rebound stroke, the rod volume of fluid flows in the opposite direction from the reserve tube, through the base valve and into the pressure tube.

The piston rod is supported at its lower end by the piston and is slidingly received at the upper end of the shock absorber by a rod guide. The rod guide thus functions as a slide bearing for the rod. The rod guide properly positions the piston rod within the pressure tube and also acts as a closure member for both the pressure tube and the reserve tube. In order for the smooth sliding of the piston rod through the rod guide, a slight clearance is formed between the inner periphery of the bearing portion of the rod guide and the outer periphery of the piston rod. This slight clearance allows for the hydraulic fluid to lubricate the interface between the piston rod and the rod guide.

In addition to locating the piston rod and closing the pressure and reserve tubes, the rod guide supports and locates a seal assembly which is designed to keep the hydraulic fluid within the shock absorber and also keep contaminants out of the shock absorber. The seal assembly normally interfaces between the reserve tube and the rod guide, between the rod guide and the piston rod and possibly between the reserve tube and the piston rod. The seal assembly is designed to keep hydraulic fluid within the shock absorber as well as keeping dirt and other contaminates from entering the shock absorber. The dirt and contaminants can be present and can adhere to the exposed portion of the piston rod.

There have been numerous seal systems designed and developed for meeting the difficult environmental and sealing requirements for shock absorbers. While these prior art seal systems have adequately performed in the field, the continued development of shock absorber seal systems has been directed towards providing similar or improved performance while reducing the manufacturing costs associated with the seal system.

SUMMARY OF THE INVENTION

The present invention provides the art with a sealing system which is low cost, easy to assemble and which meets or exceeds the sealing requirements for shock absorbers. The seal system includes an annular metal ring which engages the rod guide, a sealing member which engages the annular metal ring, the rod guide and the piston rod and a dirt wiper which engages the sealing member and the piston rod. The design is simple, low cost and it can be utilized for shock absorbers which are mechanically closed as well as for shock absorbers which are welded closed.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a schematic representation of an automobile which includes shock absorbers incorporating the unique sealing system in accordance with the present invention;

FIG. 2 is a side elevational view, partially in cross-section of a shock absorber incorporating the unique sealing system in accordance with the present invention;

FIG. 3 is an enlarged cross-sectional view of the sealing system in accordance with the present invention; and FIG. 4 is an enlarged cross-sectional view of the sealing system in accordance with another embodiment of the present invention.

DETAILED DESCRIPTION OF THE PREFERRED EMBODIMENT

Referring now to the drawings in which like reference numerals designate like or corresponding parts throughout the several views, there is shown in FIG. 1, a vehicle incorporating shock absorbers which include the unique sealing system in accordance with the present invention which is designated generally by the reference numeral 10. Vehicle 10 includes a rear suspension system 12, a front suspension system 14 and a body 16. Rear suspension system 12 includes a pair of rear suspension arms adapted to operatively support a pair of rear wheels 18. Each rear suspension arm is attached to body 16 by means of a shock absorber 20 and a helical coil spring 22. Similarly, front suspension system 14 includes a pair of suspension arms adapted to operatively support a pair of front wheels 24. Each suspension arm is attached to body 16 by means of a shock absorber 26 and a helical coil spring 28. Rear shock absorbers 20 and front shock absorbers 26 serve to dampen the relative movement of the unsprung portion of vehicle 10 (i.e., front and rear suspension systems 12,14) with respect to the sprung portion (i.e., body 16) of vehicle 10. While vehicle 10 has been depicted as a passenger vehicle having independent front and rear suspension systems 12,14, shock absorbers 20 and 26 may be used with other types of vehicles having other types of suspensions and springs or in other types of applications including, but not limited to, vehicles incorporating air springs, leaf springs, non-independent front and/or non-independent rear suspension systems. Further, the term "shock absorber" as used herein is meant to refer to dampers in general and thus will include MacPherson struts, spring seat units as well as other shock absorber designs known in the art.

Referring now to FIG. 2, rear shock absorber 20 is shown in greater detail. While FIG. 2 shows only rear shock absorber 20, it is to be understood that front shock absorber 26 is also designed to include the seal system in accordance with the present invention. Front shock absorber 26 only differs from rear shock absorber 20 in the way it is adapted to be connected to the sprung and unsprung portions of vehicle 10. Shock absorber 20 comprises a pressure tube 30, a piston 32, a piston rod 34, a reserve tube 36 and a base valve assembly 40.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper rod guide 50 which closes the upper end of both pressure tube 30 and reserve tube 36. A sealing system 52 seals the interface between rod guide 50, reserve tube 36 and piston rod 34. The end of piston rod 34 opposite to piston 32 is adapted to be secured to the sprung portion of vehicle 10. Valving within piston 32 controls the movement of fluid between upper working chamber 44 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 when compared with the amount of fluid displaced in lower working chamber 46. This difference in the amount of fluid displaced is the rod volume and it flows through base valve assembly 40.

Reserve tube 36 surrounds pressure tube 30 to define a reserve chamber 54 located between the tubes. The bottom end of reserve tube 36 is closed by an end cap 56 which is adapted to be connected to the unsprung portion of vehicle 10. The upper end of reserve tube 36 is attached to rod guide 50 by mechanically deforming the open end of reserve tube 36 to form a retaining flange 58. Base valve assembly 40 is disposed between lower working chamber 46 and reserve chamber 54 to control the flow of fluid, the rod volume of fluid, between the two chambers. When shock absorber 20 extends in length (rebound), an additional amount of fluid is needed in lower working chamber 46. Thus, fluid will flow from reserve chamber 54 to lower working chamber 46 through base valve assembly 40. When shock absorber 20 shortens in length (compression), an excess of fluid must be removed from lower working chamber 46. Thus, fluid will flow from lower working chamber 46 to reserve chamber 54 through base valve assembly 40.

The present invention is directed to a unique sealing system 52 which operates to keep hydraulic fluid within shock absorber 20 while keeping dirt and other contaminants from entering shock absorber 20.

Referring now to FIG. 3, sealing system 52 comprises a positioning ring 60, a damper seal 62 and a dirt wiper 64. Positioning ring 60 is a metal or a plastic positioning ring which is seated on an annular shoulder 66 defined by rod guide 50.

Damper seal 62 is an elastomeric seal which defines an annular groove 68 within which positioning ring 60 is located. Positioning ring 60 can be a separate component or positioning ring 60 can be bonded to damper seal 62 during or after the molding operation for seal 62. The outer diameter of damper seal 62 sealingly engages rod guide 50. Seal 62 defines a lower annular seal lip 70 that engages piston rod 34 at a position below shoulder 66 of rod guide 50 and an upper annular seal lip 72 that engages piston rod 34 at a position above shoulder 66 of rod guide 50. A spring 74 is located in a groove 76 radially outward from lower annular seal lip 70. Spring 74 urges lower annular seal lip 70 into engagement with piston rod 34. Lower annular seal lip 70 acts primarily as a seal which keeps hydraulic fluid within shock absorber 20. Any hydraulic fluid which adheres to the outer surface of piston rod 34 will be wiped off of piston rod 34 back into shock absorber 20 by lower annular seal lip 70. While acting primarily as an oil seal, lower annular seal lip 70 will also act to stop dirt and contamination from entering shock absorber 20. Upper annular seal 72 acts primarily as a seal which keeps dirt and other contaminants out of shock absorber 20. Any dirt or contaminants located on the outer surface of piston rod 34 will be wiped off by upper annular seal lip 72. While acting primarily as a dirt seal, upper annular seal lip 72 will also act as an oil seal to keep hydraulic fluid within shock absorber 20.

Dirt wiper 64 is hard plastic component, preferably Teflon® (Polytetrafluoroethylene), which includes an annular section 80 and a frusto-conical section 82. Annular section 80 rests within an annular groove 84 formed in the upper surface of damper seal 62. Frusto-conical section 82 extends upward from annular section 80 over upper annular seal 72 to provide protection for damper seal 62. The upper end of frusto-conical section 82 defines a lip 86 which rides against piston rod 34 and operates to wipe or remove any dirt, water or contaminants adhering to piston rod 34. The stiffness of the hard plastic of dirt wiper 64 enables it to remove contaminants which could possibly damage portions of damper seal 62.

FIGS. 2 and 3 illustrate shock absorber 20 within a mechanical closing. Rod guide 50 is inserted into an open reserve tube 36 and secured to pressure tube 30. Sealing system 52 is assembled to rod guide 50 either prior to or after insertion of rod guide 50 into reserve tube 36. Once assembled, the open end 90 of reserve tube 36 is rolled over to form retaining flange 58 to complete the assembly of shock absorber 20.

FIG. 4 shows a shock absorber 20' which is the same as shock absorber 20 except for the method of closing the shock absorber. Shock absorber 20' includes an oil seal cap 96 which is inserted between rod guide 50 and reserve tube 36. Once assembled, oil seal cap 96 is welded to reserve tube 36 at 98 to complete the assembly of shock absorber 20.

While the above detailed description describes the preferred embodiment of the present invention, it should be understood that the present invention is susceptible to modification, variation and alteration without deviating from the scope and fair meaning of the subjoined claims.

What is claimed is:

1. A shock absorber comprising:
   a pressure tube defining a working chamber;
   a piston disposed within said working chamber, said piston dividing said working chamber into an upper working chamber and a lower working chamber;
   a piston rod attached to said piston, said piston rod extending from said piston through one end of said pressure tube;
   a rod guide disposed between said one end of said pressure tube and said piston rod; and
   a sealing system disposed between said rod guide and said piston rod, said sealing system comprising:
      a positioning ring engaging said rod guide;
      a compliant damper seal disposed between said positioning ring, said rod guide and said piston rod, said damper seal defining a lower seal lip sealingly engaging said piston rod, an upper seal lip sealingly engaging said piston rod and an outer surface sealingly engaging said rod guide; and
      a rigid dirt wiper disposed between said damper seal and said piston rod, said dirt wiper defining a lip for engaging said piston rod.

2. The shock absorber according to claim 1, further comprising a reserve tube disposed around said pressure tube, said reserve tube engaging said rod guide and said sealing system.

3. The shock absorber according to claim 2, wherein said reserve tube includes a separate oil seal cap.

4. The shock absorber according to claim 2, wherein said damper seal assembly engages said reserve tube.

5. The shock absorber according to claim 4, wherein said damper seal sealingly engages said rod guide.

6. The shock absorber according to claim 1, wherein said damper seal assembly engages said reserve tube.

7. The shock absorber according to claim 1, wherein said sealing system further comprises a spring for urging said lower seal lip into engagement with said piston rod.

8. The shock absorber according to claim 1, wherein said dirt wiper defines a frusto-conical portion disposed over said damper seal.

9. The shock absorber according to claim 1, wherein said rod guide defines an annular shoulder for engagement with said positioning ring and said damper seal defines a first annular groove for engagement with said positioning ring and a second annular groove for engagement with said dirt wiper.

10. The shock absorber according to claim 9, wherein said sealing system further comprises a spring for urging said lower seal lip into engagement with said piston rod.

11. The shock absorber according to claim 9, wherein said dirt wiper defines a frusto-conical portion disposed over said damper seal.

12. The shock absorber according to claim 9, further comprising a reserve tube disposed around said pressure tube, said reserve tube engaging said rod guide and said sealing system.

13. The shock absorber according to claim 12, wherein said reserve tube includes a separate oil seal cap.

14. The shock absorber according to claim 12, wherein said damper seal assembly engages said reserve tube.

15. The shock absorber according to claim 14, wherein said damper seal sealingly engages said rod guide.

16. A shock absorber comprising:
   a pressure tube defining a working chamber;
   a piston disposed within said working chamber, said piston dividing said working chamber into an upper working chamber and a lower working chamber;
   a piston rod attached to said piston, said piston rod extending from said piston through one end of said pressure tube;
   a rod guide disposed between said one end of said pressure tube and said piston rod; and
   a sealing system disposed between said rod guide and said piston rod, said sealing system comprising:
      a positioning ring engaging said rod guide;
      a damper seal disposed between said positioning ring, said rod guide and said piston rod, said damper seal defining a lower seal lip sealingly engaging said piston rod, an upper seal lip sealingly engaging said piston rod and an outer surface sealingly engaging said rod guide; and
      a hard plastic dirt wiper disposed between said damper seal and said piston rod, said dirt wiper defining a lip for engaging said piston rod.

17. A shock absorber comprising:
   a pressure tube defining a working chamber;
   a piston disposed within said working chamber, said piston dividing said working chamber into an upper working chamber and a lower working chamber;
   a piston rod attached to said piston, said piston rod extending from said piston through one end of said pressure tube;
   a rod guide disposed between said one end of said pressure tube and said piston rod; and
   a sealing system disposed between said rod guide and said piston rod, said sealing system comprising:
      a positioning ring engaging said rod guide;
      a damper seal having a first hardness disposed between said positioning ring, said rod guide and said piston rod, said damper seal defining a lower seal lip sealingly engaging said piston rod, an upper seal lip sealingly engaging said piston rod and an outer surface sealingly engaging said rod guide; and
      a dirt wiper having a second hardness disposed between said damper seal and said piston rod, said dirt wiper defining a lip for engaging said piston rod, said second hardness being greater than said first hardness.

* * * * *